United States Patent [19]
Wunderlich

[11] 3,805,619
[45] Apr. 23, 1974

[54] CALIBRATION CLIP FOR A BOURDON TUBE GAUGE

[75] Inventor: Wolfgang G. Wunderlich, Saugus, Calif.

[73] Assignee: HTL Industries, Inc., Monrovia, Calif.

[22] Filed: Oct. 19, 1972

[21] Appl. No.: 299,155

[52] U.S. Cl. ............................................. 73/418
[51] Int. Cl. ................................................ G01l 7/04
[58] Field of Search ............ 73/418, 411, 412, 413, 73/414, 415, 416, 417, 4

[56] References Cited
UNITED STATES PATENTS
2,209,910   7/1940   Young .................... 73/411
2,223,580   12/1940  Ruopp .................... 73/418
3,688,586   9/1972   Koch...................... 73/418

Primary Examiner—Donald O. Woodiel
Attorney, Agent, or Firm—Jackson & Jones Law Corporation

[57] ABSTRACT

A method of calibration and a calibration clip is provided having a clamping member at one end connected to a movable arm. The clamping member is adapted to slide along the coils of a bourdon tube to adjust the number of coils required to produce a desired arc range upon pressurization. When the clamping member is positioned correctly on the coil, it is locked in place with the movable arm. The movable arm can be mounted on a rotatable sleeve having locking means. Alternatively, the movable arm can be a spring member that engages a component and can be released for rotation by the application of force to the gripping portion.

18 Claims, 8 Drawing Figures

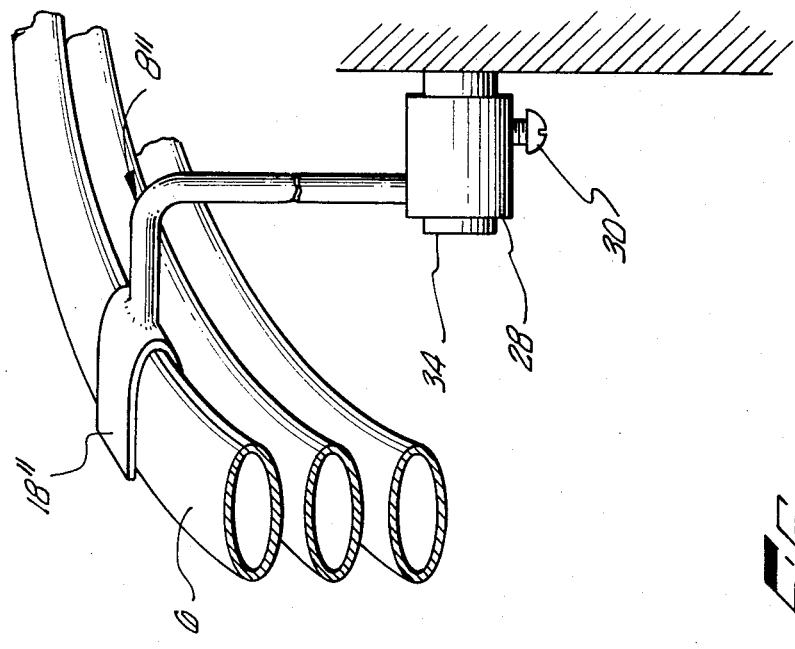
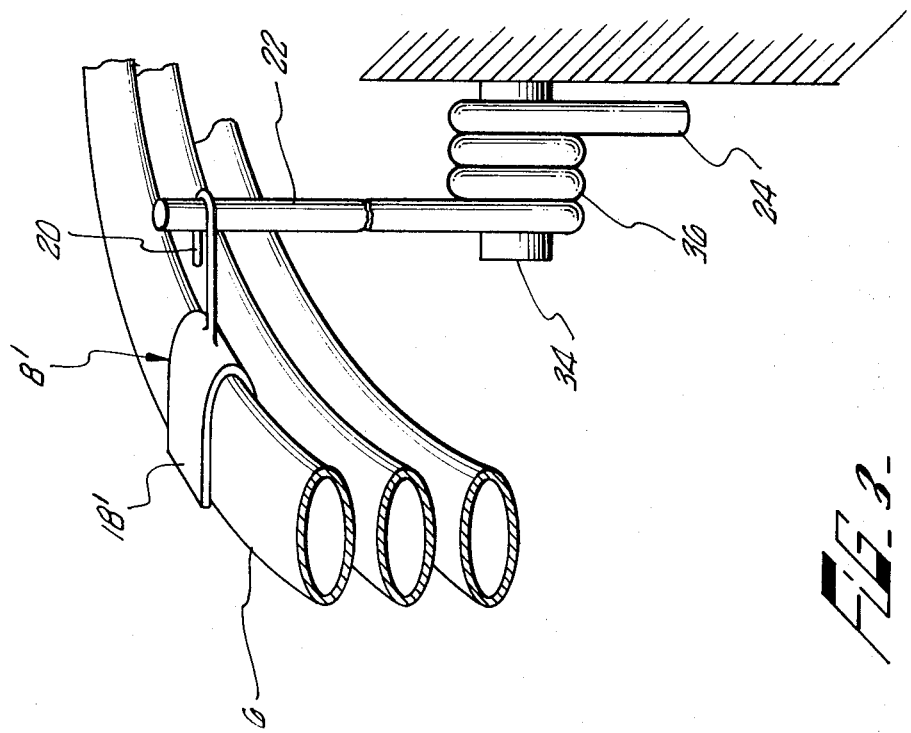

CALIBRATION CLIP FOR A BOURDON TUBE GAUGE

BACKGROUND OF THE INVENTION

1. Field of the Invention

The present invention concerns calibrating pressure gauges and more particularly, calibrating bourdon tube gauges.

2. Description of the Prior Art

In the manufacturing of bourdon tube gauges, the total arc output at a particular pressure application for coil configuration is subject to a number of variations such as the particular method of forming the coil, the particular heat treatment applied to size the coil, the quality of workmanship, etc. As a result, it requires an individual calibration of the coil over its particular operative pressure range within a pre-determined arc range. For example, some gauges utilize a 270° arc dial and the average accuracy requirements on the gauge usually demand a plus or minus 0.675° throughout the 270° reading if a quarter degree accuracy is required.

Generally the prior art has found that individual coils can vary in their total arc output from 270° to 310°.

A common method of calibrating gauges in the prior art has been to provide more bourdon coils than effectively needed and then through a process of trial and error to remove a portion of the coil until the calibration is effectuated. This procedure, as can be readily understood, is costly from a labor viewpoint and if too much of the coil is removed, the coil will be irreparably lost.

Recently, a calibration method using a member that connects the shaft of a pointer to a free end of the bourdon tube has been suggested in U.S. Pat. No. 3,375,719 (1968). However, the connecting member is forced to rotate upon coil pressurization and thus transmits the rotational coil movement to the pointer shaft.

SUMMARY OF THE INVENTION

A method of calibration and apparatus is provided for calibrating a bourdon coil pressure gauge. The calibration clip having a clamping member at one end is adapted to be fastened to a stationary base. The clamping member is adapted to slide along the bourdon coils to permit an adjustment of the number of coils required to produce a desired arc range when pressurized. The movable arm can be a spring member that upon the appropriate application of force will release its grip on a stationary component to permit the calibration adjustment. In the alternative, the movable arm can be an integral one-piece member having a rotatable sleeve adapted to be adjustably mounted on the stationary component.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

The above description will be readily understood in reference to the following drawings in which:

FIG. 3 is a perspective view of the calibration clip of the present invention with a spring take-off arm;

FIG. 4 is an alternative embodiment of the present invention using a one piece clip member;

DESCRIPTION OF THE PREFERRED EMBODIMENT

Figure 1:
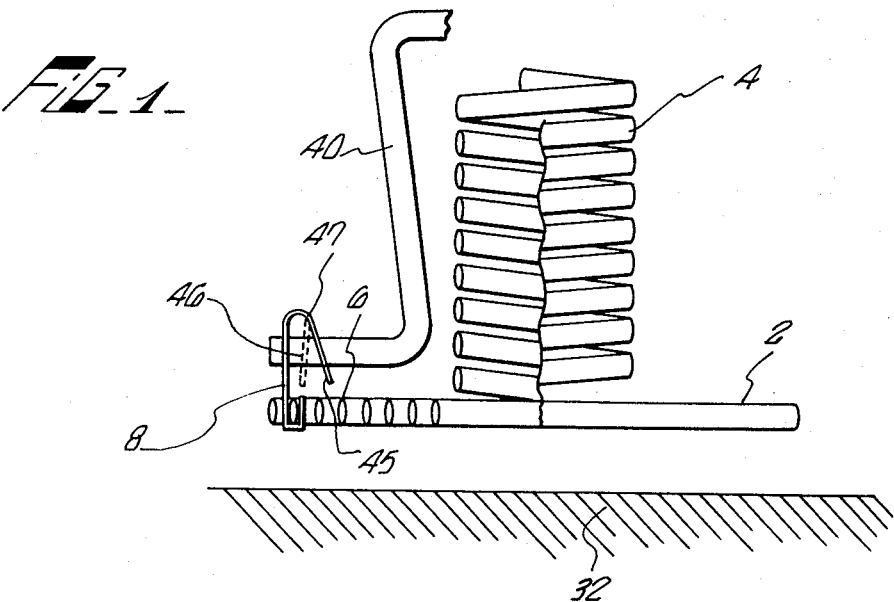
FIG. 1 is a partial cross-sectional side view of a T-shaped bourdon coil using the calibration clip of the present invention.
Figure 2:
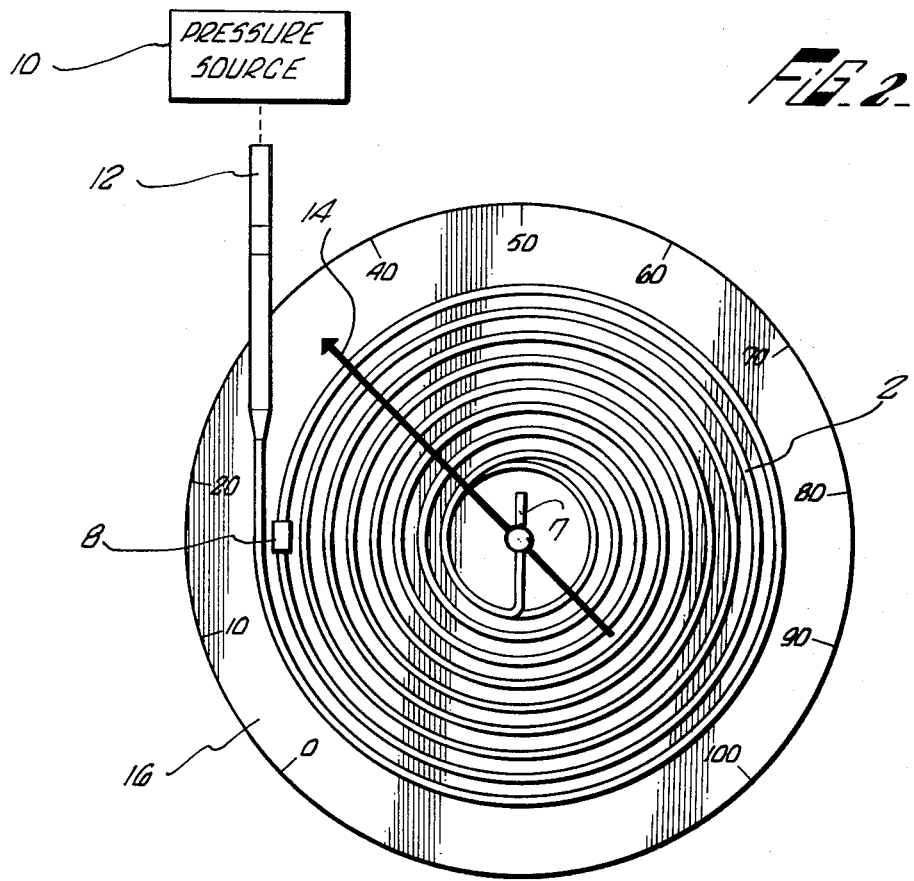
FIG. 2 is a plan view of a T-shaped bourdon coil.

Referring to FIGS. 1 and 2, a T-shaped bourdon coil 2 comprising an upper helical coil 4 and a lower spiral base coil 6 provides the pressure sensitive element of a pressure gauge. As can be seen from FIG. 2, the pressure gauge has a facing dial 16 appropriately mounted in a gauge housing 32 and the upper free end 7 of the bourdon coil is appropriately sealed and fixed to a pointer 14. The pointer 14 cooperates with the dial 16 to indicate the pressure existing in, for example, a pressure source 10 attached to the bourdon coil 2 through a coupling 12.

The calibration arrangement presented herein will accommodate not only the T-shaped bourdon coil 2 disclosed in FIG. 2, but also other coil designs and configurations such as a single helical layer coil, a multi-helical layer coil, and a spiral coil. The total arc output of the bourdon coils when pressurized and permitted to rotate freely about their axis is proportional to the number of turns sensing the pressure. Hence, arcing capability of a bourdon coil can be varied by controlling or adjusting the number of active coil turns that are permitted to transpose their rotational movement upon another component which in our illustrated embodiment will be the pointer 14. By permitting only the active coil turns to be rotated upon the pressurization of the coil component, that is the coil turns that are contributing to the total arc output of the pointer 14 and by keeping the inactive coil turns stationary, a control of the arcing capability of a bourdon tube coil is provided.

Referring to FIG. 1, it can be seen that the inactive coils and the calibration clip 8 itself remain stationary thus permitting only the active coils which in the embodiment disclosed in FIG. 1 will be both the helical upper coil 4 and the lower spiral base coil 6 that is unrestrained to be the only portion of the bourdon tube that contributes to the total arc output represented by the position of the pointer 14.

Figure 5:
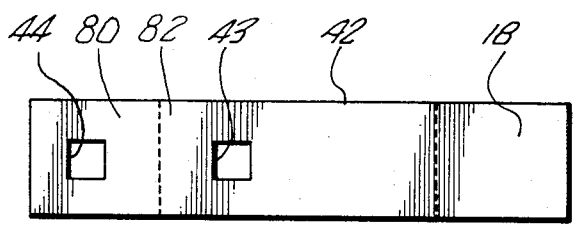
FIG. 5 is a plan view of one embodiment of the clip.
Figure 8:
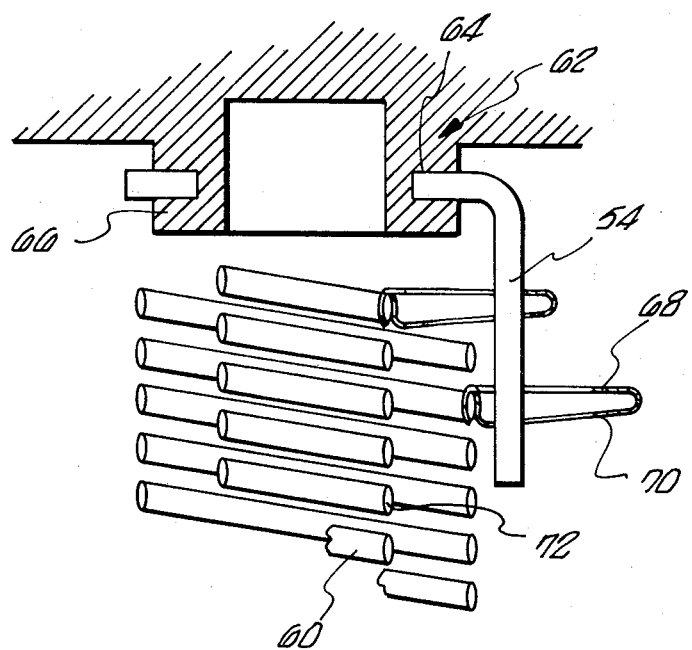
FIG. 8 is a cross sectional view of a multi-helical coil.

The calibration clip 8 is attached to an S-shaped cross sectionally square adjustment arm 40 that is adjustably attached to the gauge housing 32 in a fashion that is more readily apparent in FIG. 8 to be described. A form of the clip 8 is seen in FIG. 5 as clip blank pattern 42. One end of the blank is folded to form a clamp member 18 for attachment to the spiral base coil 6. The other end 45 has a pair of rectangular openings 43 and 44 slightly larger than the adjustment arm 40. The end 45 is bent into a spring biased position with a pair of leg members 82 and 80 each having a respective opening 43 and 44 that when depressed as seen in the trace lines 46 of FIG. 1 will permit a free travel along the adjustment arm 40. When the end 45 is released, it attempts to return to its free position 47 but is restrained by the adjustment arm 40 causing the clip 8 to lock itself to the adjustment arm 40.

Referring to FIG. 3, a more detailed view of one embodiment of the calibration clip is disclosed in which a clamp member 18' is designed to grasp a portion of the spiral base coil 6 and to hold it inactive. Since in operation, the coil is under pressure and will expand and will actually produce relatively little torque force along its length, the clamp member 18' can effectively hold the coil with merely a frictional contact.

As shown in FIG. 3, clamp member 18' is connected to an arm terminating in a hook 20. The clamp member 18' is slid along the tube 6 to the desired calibration point. The spring take-off arm 22 serves as the stationary reference for the calibration clip 8' and it is moved to its desired position by relaxing the spring coils 36 wrapped about the component member 34 mounted on the closing plate of the gauge housing 32 by applying opposing forces on the spring lever 24 and the spring take-off arm 22.

When the spring coils 36 relaxed, the spring take-off arm 22 can be rotated about the component 34 to the desired calibration point. By simply releasing the forces on the spring lever 24 and the spring take-off arm 22, the spring coils 36 will again be securely tensioned on the component 34.

Referring to FIG. 4, an alternative embodiment of the present invention is provided where the clamp member 18'' is positioned on the take-off arm 26 which in turn is rigidly fastened to a sleeve 28. The sleeve 28 is rotatable about the component 34 and is held in position by a set screw 30. In operation, the take-off arm 26 and clamp member 18'' are rotated to the desired calibration point and then set screw 30 is fastened to secure the calibration adjustment.

Since the calibration clip 8 provides a set reference point, the inactive coils upstream of calibration clip 8 relative to the pressure source, that is that length of tube from the coupling member 12 to the calibration clip 8, will remain inactive, will not rotate, and will not influence the position of the pointer 14. Only the active coils extending from the calibration clip 8 to the upper closed free end 7 attached to the pointer 14 will be capable of transmitting rotational motion ot the pointer 14 upon pressurization within a desired arc range.

It should be realized that by a simple mofification of the calibration clip 8, the present invention can be utilized on all forms of bourdon tube gauges. Thus, it is quite possible to use the same principles of the invention on a multi-layer helical coil arrangement as shown in FIG. 8 by providing the desired shape to the take-off arm to permit it to fasten at the appropriate point to a portion of the helical coil tubes 72.

Figure 6:
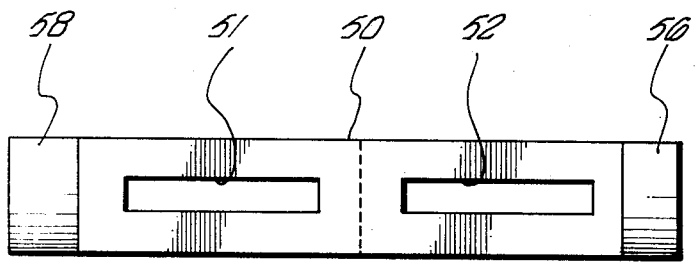
FIG. 6 is a plan view of another embodiment of the clip.
Figure 7:
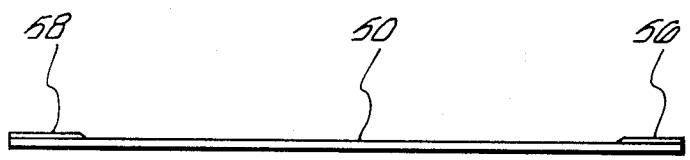
FIG. 7 is a side view of FIG. 6.

A variation of the calibration clip 8 is shown in FIGS. 6 – 8. The clip blank 50 has a pair of elongated rectangular openings 51 and 52 that are slightly larger than the adjustment arm 54. The ends 56 and 58 of the clip blank 50 are arcuately bent to conform to the circular configuraton of the multi-helical layer coil 60.

The adjustment arm 54 has a square cross sectional shape and is cantilevered from a spring biased circular base member 62. A circular groove 64 on an axial hub member 66 positions the circular base member 62. The base member 62 is adjustable about the hub member 66 by either the release of the spring tension or the overcoming of the friction between the base member 62 and the groove 64. The S-shaped adjustment arm 40 can utilize a similar base member.

The clip blank 50 is bent in the middle to form a pair of L-shaped legs 68 and 70, leg 68 being longer. The arcuate ends 56 and 58 are adapted to lock the clip blank 50 to the coil tubes 72 at the desired position. The adjustment arm 54 passes freely through the rectangular openings 51 and 52 and merely prevents rotational movement of the clip blank 50 and corespondingly the inactive coils of the coil tube 72.

While the present invention has been described with respect to the preferred embodiments, it should be clear that craftsmen skilled in the art can make modifications within the scope of the present invention and accordingly, the invention should be measured solely from the following claims.

What is claimed is:

1. In a pressure gauge having a pressure sensitive bourdon tube assembly connected at a first end to an indicator for providing an indication of pressure and adapted to be mounted in a housing, the improvement comprising a calibration clip assembly comprising:
   a clamping member operatively fastened to the bourdon tube assembly adjacent the second end of the tube assembly;
   a movable arm connected to the clamping member, and
   gripping means including a spring coil for fastening the movable arm to the housing.

2. A calibration clip assembly as in claim 1 wherein the clamping member and movable arm are a single spring clip having a pair of elongated openings adapted to permit relatively free movement of the gripping means in a radial direction of tube configuration.

3. In a pressure gauge having a pressure sensitive bourdon tube assembly connected at a first end to an indicator for providing an indication of pressure and adapted to be mounted in a housing, the improvement comprising a calibration clip assembly comprising:
   a clamping member operatively fastened to the bourdon tube assembly adjacent the second end of the tube assembly;
   a movable arm connected to the clamping member, and
   gripping means including a rotatable sleeve and locking means on the sleeve for fastening the movable arm to the housing.

4. In a pressure gauge having a pressure sensitive bourdon tube assembly connected at a first end to an indicator for providing an indication of pressure and adapted to be mounted in a housing, the improvement comprising a calibration clip assembly comprising:
   a U-shaped clamping member frictionally engaging the bourdon tube assembly adjacent the second end of the tube assembly;
   a movable arm connected to the clamping member;
   gripping means including a spring coil and spring lever for fastening the movable arm to the housing, and
   a protruding member on the housing receiving the spring coil.

5. In a pressure gauge having a pressure sensitive bourdon tube assembly connected at a first end to an indicator for providing an indication of pressure and adapted to be mounted in a housing, the improvement comprising a calibration clip assembly comprising:
a clip member having a pair of biased movable leg members and a clamping member operatively fastened to the bourdon tube assembly, each leg member having an opening, and
gripping means for fastening the clip member to the housing by operatively coacting with the openings in the leg members when the leg members are moved to a fixed position.

6. A calibration clip assembly as in claim 5 wherein the gripping means includes a spring coil.

7. A calibration clip assembly as in claim 6 further including means on the housing adjacent the second end of the tube for receiving the spring coil.

8. A calibration clip assembly as in claim 6 further including a spring lever.

9. A calibration clip assembly as in claim 5 wherein the gripping means includes a cantilevered arm connected to a spring base member.

10. A calibration clip assembly as in claim 9 wherein the cantilevered arm has an S configuration.

11. A calibration clip assembly as in claim 10 wherein the cantilevered arm has a square cross section.

12. In a pressure gauge having a pressure sensitive bourdon tube coil assembly connected at a first end to an indicator for providing an indication of pressure and adapted to be mounted in a housing, the improvement comprising a calibration clip assembly comprising:
a spring clip having a pair of leg members and a clamping portion operatively fastened to the bourdon tube coil, each leg member having an elongated opening, and
gripping means for relatively fastening the spring clip to the housing, the gripping means extending through the elongated openings to permit relatively free movement of the gripping means in a radial direction of the tube coil configuration.

13. A calibration clip assembly as in claim 12 wherein the spring clip has a pair of L-shaped legs, one leg adapted to extend over one side of the tube and the other leg adapted to extend over the opposite side of the tube when in a locked position.

14. A calibration clip assembly as in claim 13 wherein the bottom portion of each leg has an arcuate configuration.

15. A calibration clip assembly as in claim 5 wherein the clamping portion is connected to the end of one of the leg members and the gripping means extends through the openings in the leg member whereby when the leg members are depressed, the gripping means can pass freely through the openings for relative adjustment of the clip member.

16. A calibration clip assembly as in claim 15 wherein the clamping member is a U-shaped member that frictionally engages the tube.

17. A calibration clip assembly as in claim 15 where the gripping means includes a rotatable sleeve and locking means on the sleeve.

18. A calibration clip assembly as in claim 15 wherein the clamping member is U-shaped and adapted to frictionally engage the tube, the gripping means includes a spring coil and lever, and the housing has a protruding member adapted to receive the spring coil.

* * * * *